June 20, 1961   R. F. KNIGHT ET AL   2,988,915
APPARATUS FOR MEASURING WEIGHT ON WELL DRILLING BIT
Filed Aug. 22, 1957
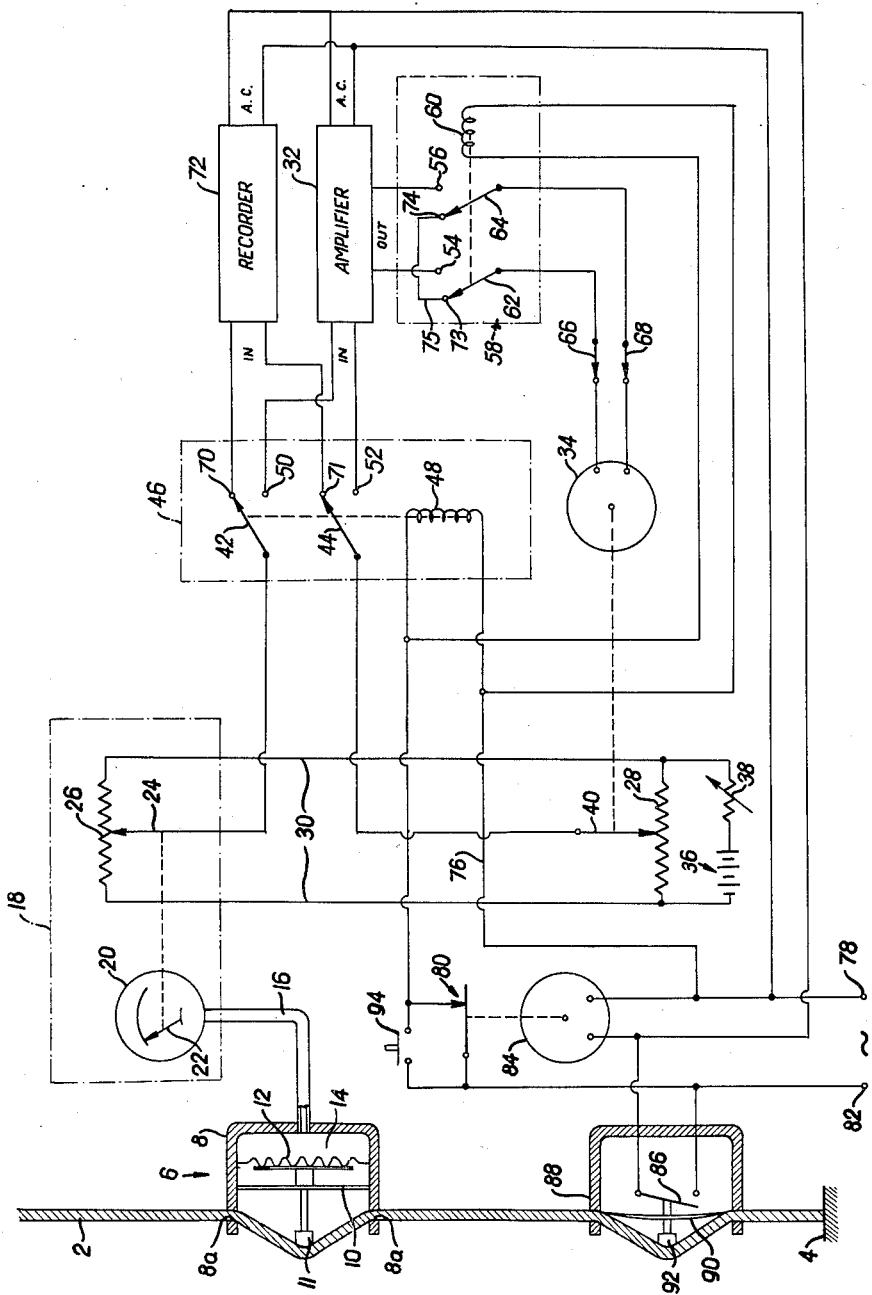
INVENTORS
ROBERT F. KNIGHT
RALPH E. JENKINS
BY
Curtis, Morris & Safford
ATTORNEYS

United States Patent Office

2,988,915
Patented June 20, 1961

2,988,915
APPARATUS FOR MEASURING WEIGHT ON WELL DRILLING BIT
Robert F. Knight and Ralph E. Jenkins, Irving, Tex., assignors to Core Laboratories, Inc., Dallas, Tex.
Filed Aug. 22, 1957, Ser. No. 679,643
3 Claims. (Cl. 73—144)

This invention relates to apparatus for measuring the weight imposed on a drilling bit used, for example, in the drilling of oil or gas wells by the rotary method.

In the rotary drilling of wells, the drilling bit is mounted at the lower end of a column of drill pipe which is rotated by means of a square section of pipe or "kelly" which is secured at the upper end of the column and passes through a square opening in a rotary table driven by a suitable source of mechanical power, such as a steam or diesel engine. The pipe column or drill stem is raised and lowered by means of cable tackle driven by a suitable draw works. The weight of the drill stem is imposed on the drilling bit at the bottom of the bore hole, except that at greater depths the weight of the drill stem is so great that it would impose an excessive weight on the bit if a portion of such weight were not taken up by the draw works. In order to properly control the draw works and achieve the desired amount of weight on the drilling bit, it is desirable or even necessary to have an accurate method of measuring the weight imposed on the drilling bit.

It is among the objects of the present invention to provide apparatus for measuring the weight imposed on the drilling bit which is accurate and reliable in operation, which is simple and relatively inexpensive in construction, which can be readily applied to a conventional drilling rig without interference with its normal operation and which operates automatically and continuously without attention or special precaution on the part of the drilling crew.

The single figure of drawing is a schematic diagram of the electrical circuit of an illustrative weight measuring apparatus embodying features of the present invention.

In general terms, the present invention provides an apparatus which includes a first variable circuit element (in the particular embodiment shown in the drawing, a potentiometer) which is effectively connected to the hoisting cable which supports the drill stem for variation of the circuit element in accordance with the tension imposed on the hoisting cable—in other words, in accordance with the portion of the total weight of the drill stem which is supported by the cable at any given time. There is also means for storage of the information as to the condition of the first variable element (for example, a second potentiometer of the same type), and means for measuring the difference between the conditions of these two elements (for example, a Wheatstone bridge circuit). There is a motor for balancing the second potentiometer relative to the first, the motor being controlled by the bridge circuit, so that the motor drives the second potentiometer to the same resistance setting as the first, whereupon the output voltage of the bridge circuit drops to zero and the motor automatically stops. Means is also provided for indicating the difference in the settings of the two potentiometers after the drilling bit reaches the bottom of the well and assumes the support of a portion of the weight of the pipe column (for example, a voltmeter or voltage recorder). Finally, means is provided to switch the bridge circuit from the motor-driven potentiometer-balancing circuit to the recorder, this switching means including a "dead-line" switch which is automatically actuated by changes in tension on the cable, so that following each occasion when the drill pipe is supported by "slips" in the rotary table, the balancing circuit is activated.

With reference to the drawing, the specific illustrative circuit shown there will now be described.

Extending vertically along the left-hand side of the drawing is the "dead-line" portion of the hoisting cable 2 which supports the drill stem. As will readily be understood by those familiar with this art, the cable 2 extends from the draw works to the crown block of the derrick, makes a number of turns around the sheaves of the crown block and traveling block and, after its final turn around the crown block, extends downwardly to a fixed tie point 4 at one of the lower corners of the derrick. Fastened at a convenient point on the cable 2 is a tension sensing device generally designated 6 which includes a U-shaped frame 8 having near the ends of its two legs openings 8a through which the cable 2 passes. Extending between the two legs of the frame 8 is a spring plate 10 which carries at its center a projecting shoe 11 which bears against the cable 2. The spring plate 10 engages a movable diaphragm 12 which forms the wall of liquid-filled pressure chamber 14. The stiffness of the spring plate 10 is such that the portion of the cable between the legs of the frame 8 is normally bent out of line by the shoe 11, as shown in the drawing. As additional tension is placed on the cable 2 by adding sections of drill pipe, the spring plate 10 is bowed inwardly, moving the diaphragm 12 to compress the pressure chamber 14 and increase the pressure of the liquid therein. The pressure chamber 14 is connected through tube 16 with a pressure measuring device generally designated 18, which is schematically illustrated as a pressure gauge 20, the pointer 22 of which is mechanically coupled to the wiper arm 24 of a potentiometer 26. However, the visible dial and pointer of the pressure gauge are not necessary; instead, the wiper arm of the potentiometer 24 may be controlled directly by a member which moves in response to pressure—for example, a diaphragm or a Bourdon tube. It will be understood that, as the tension on the cable 2 changes, the diaphragm 12 is moved, changing the pressure in the pressure chamber 14 and tube 16, resulting in a movement of the gauge 20 or other pressure-sensitive device, and of the wiper arm 24 of the potentiometer 26. The resistance setting of the potentiometer 26 is therefore dependent at all times upon the degree of tension imposed on the cable 2.

Connected in parallel with the potentiometer 26 is an identical potentiometer 28 which serves the function of a "memory" or storage device for duplicating the resistance setting of the potentiometer 26 at selected times. In general terms, this is accomplished by a differential resistance measuring circuit generally designated 30, a D.C. amplifier 32 connected thereto, and an electric motor 34 controlled by the amplifier 32 and coupled to drive the wiper arm of the potentiometer 28. The differential resistance measuring circuit 30 is a Wheatstone bridge circuit in which a D.C. voltage is imposed across the two potentiometers 26 and 28 in parallel by means of a battery 36, for example a one-volt mercury cell, and a calibrating potentiometer 38 connected in series therewith. As will be readily understood, between the wiper arms 24 and 40 of the two potentiometers there will be developed a D.C. voltage which is proportional to the difference in the resistance settings of the two potentiometers—i.e. to the relative displacement of their respective wiper arms. The wiper arms are respectively connected to the movable contacts 42 and 44 of a relay generally designated 46. When the winding 48 of the relay 46 is energized, the movable contacts 42 and 44 are respectively in engagement with fixed contacts 50 and 52 which are connected to the input terminals of the D.C. amplifier 32. The output terminals of the amplifier 32 are connected to the fixed contacts 54 and 56 of a relay generally designated 58. When the winding 60 of the relay 58 is energized, these fixed contacts 54 and 56 are engaged by the movable contacts 62 and 64 of the relay, which are connected through the limit switches 66 and 68 across the winding of the motor 34. When the relays 46 and 58 are thus energized, the amplifier 32 will amplify the relatively weak D.C. signal output of bridge circuit and furnish power to drive the motor 34 in such direction to reduce the D.C. signal voltage. When the D.C. voltage is reduced to zero—i.e. when the wiper arm 40 of potentiometer 28 is in the same relative position as the wiper arm 24 of potentiometer 26—the motor 34 will automatically stop.

When the winding 48 of the relay 46 is deenergized, its movable contacts 42 and 44 are respectively in engagement with other fixed contacts 70 and 71 of the relay, which are connected to the input terminals of a recorder generally designated 72. When the winding 60 of relay 58 is deenergized, its movable contacts are respectively in engagement with other fixed contacts 73 and 74, across which a shunt 75 is connected.

The windings 48 and 60 of the two relays 46 and 58 are connected in parallel, one terminal of each of the two windings being connected through a line 76 with one terminal 78 of a source of A.C. power. The other terminal of each of the two windings 48 and 60 is connected through a timer switch 80 with the other terminal 82 of the power source. This timer switch 80 is actuated by a timer motor 84, one of the winding terminals of which is connected to the terminal 78 of the power source and the other terminal which is connected through a "dead-line" switch 86 with the other terminal 82 of the power source. The timer motor 84 is of such construction that whenever power to the motor is cut off, the motor is automatically reset to its starting position. As soon as power is supplied to the timer motor again it commences running for a preset period of time, for example 10 seconds, whereupon the normally closed timer switch 80 is opened. The switch 80 will remain open as long as power is supplied to the timer motor 84.

The "dead-line" switch is arranged for actuation in accordance with the degree of tension imposed on the cable 2. It is constructed similarly to the above described tension sensing device 6, in that it includes a U-shaped frame 88 through the legs of which the cable 2 passes, a spring plate 90 and a shoe 92 carried thereby which bears against the cable 2 and causes the portion of the cable between the legs of the frame 88 normally to be bent out of line, as shown in the drawing. The spring plate 90 is connected to the actuating push button of the "dead-line" switch 86. The "dead-line" switch is a single-pole, single-throw switch which is normally open. However, the weight of the kelly and at least one section of drill pipe supported on the hoisting cable imposes sufficient tension on the cable 2 to close the "dead-line" switch 86 and maintain it in closed position.

The operation of this apparatus is as follows: Assume that drilling operations are proceeding and that the kelly section has been used up—that is, that since the last section of drill pipe was added the bore hole has been deepened by such amount that the upper end of the kelly is down to the rotary table. In order to add another joint of drill pipe, the driller lifts the drill stem off the bottom of the bore hole a distance equal to the length of the kelly and sets the drill pipe in slips in the rotary table. The resulting reduction in tension on the cable 2 will cause the "dead-line" switch 86 to open, breaking the circuit to the timer motor 84 and allowing the timer motor 84 to reset. This closes the timer switch 80 and energizes the windings 48 and 60 of the relays 46 and 58. Energization of relay 46 connects the wiper arms 24 and 40 of the potentiometers 26 and 28 to the input terminals of the amplifier 32, while energization of relay 58 connects the output terminals of the amplifier 32 to the motor 34. However, since the A.C. power supply circuit to the amplifier 32 is through the "dead-line" switch 86, the motor 34 will not run as long as the "dead-line" switch remains open. When the new length of pipe is added, the kelly reconnected, and the drill stem again supported on the hoisting cable, the "dead-line" switch 86 will again be closed, energizing the amplifier 32 and causing the motor 34 to drive the wiper arm 40 of the potentiometer 28 to the point where the two potentiometers 26 and 28 are balanced. This operation requires only a few seconds of time. Meanwhile, closure of the "dead-line" switch 86 will also have started the timer motor 84 and, after a preset time interval (for example, 10 seconds) which is allowed for balancing of the potentiometers 26 and 28, the timer switch 80 will be opened, deenergizing the windings 48 and 60 of the relays 46 and 58. The deenergization of the relay 58 disconnects the amplifier 32 from the motor 34 and places the shunt 75 across the motor winding. The deenergization of the relay 46 effectively connects the wiper arms 24 and 40 of the potentiometers 26 and 28 to the input terminals of the recorder 72. All of this takes place during the time the drill stem is being lowered back to the bottom of the bore hole. When the drilling bit touches bottom, some of the weight of the pipe column will be supported on the bit, reducing the tension on the cable 2. When this occurs, the resulting decrease of pressure in the chamber 14 will cause movement of the wiper arm 24 of the potentiometer 26, producing at the output terminals of the bridge circuit 30 a D.C. voltage of amplitude proportional to the amount of the relative displacement of the wiper arms. Since the amount of displacement is proportional to the reduction of the tension on the cable 2, the output voltage of the bridge circuit is indicative of the amount of weight which is being imposed on the drilling bit. This voltage is applied to the recorder 72, which will both give a continuous, visual indication and make a permanent graph of the amount of weight imposed on the drilling bit.

The potentiometers 26 and 28 may be rebalanced at any time during drilling by closure of a manual switch 94 which is connected in parallel with the timer switch 80. Closure of this manual switch 94 energizes the relays 46 and 58, disconnecting the output of the bridge circuit from the recorder 72 and connecting it to the amplifier 32 while at the same time connecting the output of the amplifier to the motor 34 and causing the motor to drive the wiper arm 40 of the potentiometer 28 to the same relative position as the wiper 24 of the potentiometer 26. The manual switch 94 is held closed long enough for this balancing operation to take place and then is released, whereupon the output of the bridge circuit is again switched to the recorder 72. The drilling bit is usually lifted off bottom momentarily during the rebalancing operation, so that the resistance setting of the potentiometer 28 will at all times be indicative of the total weight of the pipe column, while the resistance setting of the potentiometer 26 is indicative of the portion of the weight of the column which is supported by the cable 2 at any time, the difference of these two values being proportional to the weight imposed on the drilling bit.

The recorder 72 is calibrated so that the voltage impressed across its input terminals is accurately translated into an indication in terms of weight units. The calibration is, of course, dependent upon the number of lengths of cable extending between the crown block and the traveling block, the tension imposed on the cable being inversely proportional to the number of such lengths of cable. The apparatus preferably includes a calibrating circuit (such as a voltage-dividing network and tap switch) which adapts it for use with drilling rigs in which various typical numbers of sheaves are used in the crown blocks and traveling blocks.

From the foregoing description, it will be understood that the present invention provides a comparatively simple apparatus by which a continuous automatic indication record of the weight imposed on the drilling bit can be made, the equipment being susceptible of use with a standard drilling rig without interference with its normal operation and without requiring attention of the drilling crew. It will therefore be appreciated that the aforementioned and other desirable objectives have been achieved. However, it should be emphasized that the particular embodiment of the invention which is described herein and shown in the accompanying drawing is not intended as restrictive of the scope of this invention, which is limited only by the appended claims.

We claim:

1. Apparatus for measuring the weight imposed on a well drilling bit suspended by cable comprising a first potentiometer effectively coupled to said cable for variation of the resistance setting of said potentiometer in accordance with the tension of said cable, a second potentiometer similar to said first potentiometer, said potentiometers being connected in a bridge circuit across a source of electrical voltage, whereby the voltage at the terminals of said bridge circuit is proportional to the difference between the resistance settings of said potentiometers, an electric motor mechanically coupled to said second potentiometer, an amplifier circuit for amplifying the voltage at the terminals of said bridge circuit to furnish power to said motor to drive the same in the direction to balance said potentiometer and reduce such terminal voltage substantially to zero, a meter responsive to said terminal voltage, and electrical switch means connecting said terminals selectively to said amplifier circuit for balancing the resistance settings of said potentiometer with said drilling bit suspended off bottom by said cable, and to said meter for indication of the difference between the resistance settings of said potentiometers with said drilling bit on bottom.

2. Apparatus for measuring the weight imposed on a well drilling bit suspended by cable comprising a first potentiometer effectively coupled to said cable for variation of the resistance setting of said potentiometer in accordance with the tension of said cable, a second potentiometer similar to said first potentiometer, said potentiometers being connected in a bridge circuit across a source of electrical voltage, whereby the voltage at the terminals of said bridge circuit is proportional to the difference between the resistance settings of said potentiometers, an electric motor mechanically coupled to said second potentiometer, an amplifier circuit for amplifying the voltage at the terminals of said bridge circuit to furnish power to said motor to drive the same in the direction to balance said potentiometer and reduce such terminal voltage substantially to zero, a meter responsive to said terminal voltage, and electrical switch means mechanically coupled to said cable and responsive to changes in the tension thereof for automatically connecting said terminals first to said amplifier circuit for balancing the resistance settings of said potentiometers with said drilling bit suspended off bottom by said cable, and then to said meter for indication of the difference between the resistance settings of said potentiometers with said drilling bit on bottom.

3. Apparatus for measuring the weight imposed on a well drilling bit suspended by cable comprising a first potentiometer effectively coupled to said cable for variation of the resistance setting of said potentiometer in accordance with the tension of said cable, a second potentiometer similar to said first potentiometer, said potentiometers being connected in a bridge circuit across a source of electrical voltage, whereby the voltage at the terminals of said bridge circuit is proportional to the difference between the resistance settings of said potentiometers, an electric motor mechanically coupled to said second potentiometer, an amplifier circuit for amplifying the voltage at the terminals of said bridge circuit to furnish power to said motor to drive the same in the direction to balance said potentiometer and reduce such terminal voltage substantially to zero, a recorder for recording said terminal voltage, a dead-line switch mechanically coupled to said cable for actuation in response to changes in the tension of said cable effected by transfer of the support of the drill pipe to or from said cable, a timer mechanism connected to said dead-line switch whereby actuation of said dead-line switch by support of said drill pipe by said cable initiates operation of said timer for a predetermined time interval sufficient to permit balancing of said potentiometers, and a timer switch actuated by said timer mechanism at the end of said time interval, said timer switch being arranged to control the connection of said terminals first to said amplifier circuit for balancing the resistance settings of said potentiometers with said drilling bit suspended off bottom by said cable, and then after said time interval, to said recorder for indication of the difference between the resistance settings of said potentiometers with said drilling bit on bottom.

References Cited in the file of this patent
UNITED STATES PATENTS

| | | |
|---|---|---|
| 2,365,014 | Silverman et al. | Dec. 12, 1944 |
| 2,528,883 | Hayward | Nov. 7, 1950 |
| 2,703,008 | Seljos et al. | Mar. 1, 1955 |
| 2,743,340 | Zoltanski | Apr. 24, 1956 |
| 2,749,754 | Linahan | June 12, 1956 |
| 2,851,880 | Fiedler | Sept. 16, 1958 |